United States Patent
Sethi et al.

(10) Patent No.: US 11,677,680 B2
(45) Date of Patent: Jun. 13, 2023

(54) DYNAMIC ALLOCATION OF BANDWIDTH TO VIRTUAL NETWORK PORTS

(71) Applicant: Dell Products L.P., Round Rock, TX (US)

(72) Inventors: Parminder Singh Sethi, Ludhian (IN); Suren Kumar, Vellore (IN); Chitrak Gupta, Bangalore (IN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/193,770

(22) Filed: Mar. 5, 2021

(65) Prior Publication Data

US 2022/0286406 A1    Sep. 8, 2022

(51) Int. Cl.
*H04L 47/78* (2022.01)
*H04L 47/74* (2022.01)
*H04L 47/762* (2022.01)
*H04L 41/0896* (2022.01)
*G06F 9/455* (2018.01)
*H04L 47/80* (2022.01)

(52) U.S. Cl.
CPC ........ *H04L 47/781* (2013.01); *G06F 9/45558* (2013.01); *H04L 41/0896* (2013.01); *H04L 47/748* (2013.01); *H04L 47/762* (2013.01); *H04L 47/805* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 6,647,419 B1* | 11/2003 | Mogul | ........ | H04L 69/329 |
| | | | | 370/468 |
| 7,957,394 B1* | 6/2011 | Cohen | ........ | H04L 41/0806 |
| | | | | 370/230.1 |
| 2013/0268672 A1* | 10/2013 | Justafort | ........ | H04L 67/10 |
| | | | | 709/226 |
| 2013/0289926 A1* | 10/2013 | Maity | ........ | G06F 9/5077 |
| | | | | 718/1 |
| 2016/0283221 A1* | 9/2016 | Kochar | ........ | G06F 8/654 |
| 2017/0180232 A1* | 6/2017 | Nakamura | ........ | H04L 43/0894 |
| 2019/0109799 A1* | 4/2019 | Nipane | ........ | H04L 45/64 |
| 2020/0053050 A1* | 2/2020 | Malysh | ........ | H04L 63/0254 |
| 2020/0089536 A1* | 3/2020 | Sumangala | ........ | G06F 9/505 |
| 2021/0021473 A1* | 1/2021 | Leigh | ........ | H04L 41/0896 |
| 2021/0034791 A1* | 2/2021 | Singh | ........ | G06F 3/0689 |
| 2021/0126948 A1* | 4/2021 | Nedbal | ........ | H04L 63/105 |
| 2021/0152494 A1* | 5/2021 | Johnsen | ........ | H04W 28/0983 |

\* cited by examiner

*Primary Examiner* — Scott B Christensen
(74) *Attorney, Agent, or Firm* — Jackson Walker L.L.P.

(57) ABSTRACT

A disclosed method and system for allocating bandwidth among a plurality of virtual network ports assigned to a plurality of virtual machines accesses assignment information indicating which virtual network ports are assigned to which virtual machines. A network bandwidth manager (NBM) receives network utilization information indicating the network utilization of each virtual network port/The NBM further receives virtual machine priority information indicative of a derived priority for each of the plurality of virtual machines. The NBM configures bandwidth parameters for each of the virtual network ports based on the assignment information, network utilization information, and the virtual machine priority information.

14 Claims, 8 Drawing Sheets

DYNAMIC ALLOCATION OF BANDWIDTH TO VIRTUAL NETWORK PORTS

TECHNICAL FIELD

The present disclosure relates to information handling systems and, more specifically, information handling systems that support virtualized resources including virtualized network ports.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A server is a type of information handling system configured to provide one or more specific services to a client resource. A web server, as an example, receives and responds to web requests from one or more web client applications, typically either a conventional web browser or a dedicated application program. Servers are frequently, though not necessarily, highly-provisioned systems suitable for use in conjunction with large scale commercial, industrial, educational, and/or governmental operations. In these and other embodiments, a single server or a cluster of two or more servers may include hypervisor software or analogous virtualization functionality to create and manage virtual machines.

An important aspect of virtual machine management is the allocation of scarce resources, including CPU cycles, memory/storage, and network interface bandwidth. Resource allocation and, in particular, the allocation of network adapter capacity/bandwidth is a primary focus of the present disclosure.

SUMMARY

In accordance with teachings disclosed herein, common problems associated with the allocation of virtualized network resources are addressed, in whole or part, by one or more disclosed systems and methods for allocating network adapter bandwidth to virtual network ports assigned to virtual machines.

Virtualized networks ports, each assigned to a corresponding virtual machine, are allocated bandwidth based on a combination of network utilization and virtual machine priority. In embodiments suitable for use in managed platforms, bandwidth allocation may be performed by the server's baseboard management controller (BMC). In these embodiments, the BMC may access assignment information, indicative of which VM is assigned to which virtual network port, over the server's existing OS-to-BMC communication channel, referred to herein as an OS passthrough channel.

In some embodiments, analytics intelligence is used to identify and categorize the priority of each VM, e.g., high, normal, and low priority. To determine the priority of a VM, information including resource usage details, installed application details, and VM's health state and telemetry information are fed into an analytics component, which generates a derived priority list, which may be modified by an administrator. In some embodiments, data is analyzed, at least in part, with an autoregressive integrated moving average (ARIMA) or another autoregressive moving average model to determine a VM's priority level.

In some embodiments, a resource referred to herein as the Network Bandwidth Manger (NBM) is included within the BMC or elsewhere to receive network utilization data for each virtual network port and virtual machine priority level derived by an analytics component. In at least one embodiment, the NBM is configured to configure minimum and maximum bandwidth percentages for each virtual network port. In some embodiments, NBM determine bandwidth assignment values may be configured for all of the virtual network ports using an out-of-band channel.

In at least one embodiment, a disclosed method and system for allocating bandwidth among a plurality of virtual network ports assigned to a plurality of virtual machines accesses assignment information indicating which virtual network ports are assigned to which virtual machines. A network bandwidth manager (NBM) receives network utilization information indicating the network utilization of each virtual network port/The NBM further receives VM priority information indicative of a derived priority for each of the plurality of virtual machines. The NBM configures bandwidth parameters for each of the virtual network ports based on the assignment information, network utilization information, and the VM priority information.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates additional detail of a priority determination resource; and

network bandwidth manager allocating network bandwidth based on virtual machine priority and network utilization.

DETAILED DESCRIPTION

Preferred embodiments and their advantages are best understood by reference to FIGS. 1-8, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, device "12-1" refers to an instance of a device class, which may be referred to collectively as devices "12" and any one of which may be referred to generically as a device "12".

Figure 1:
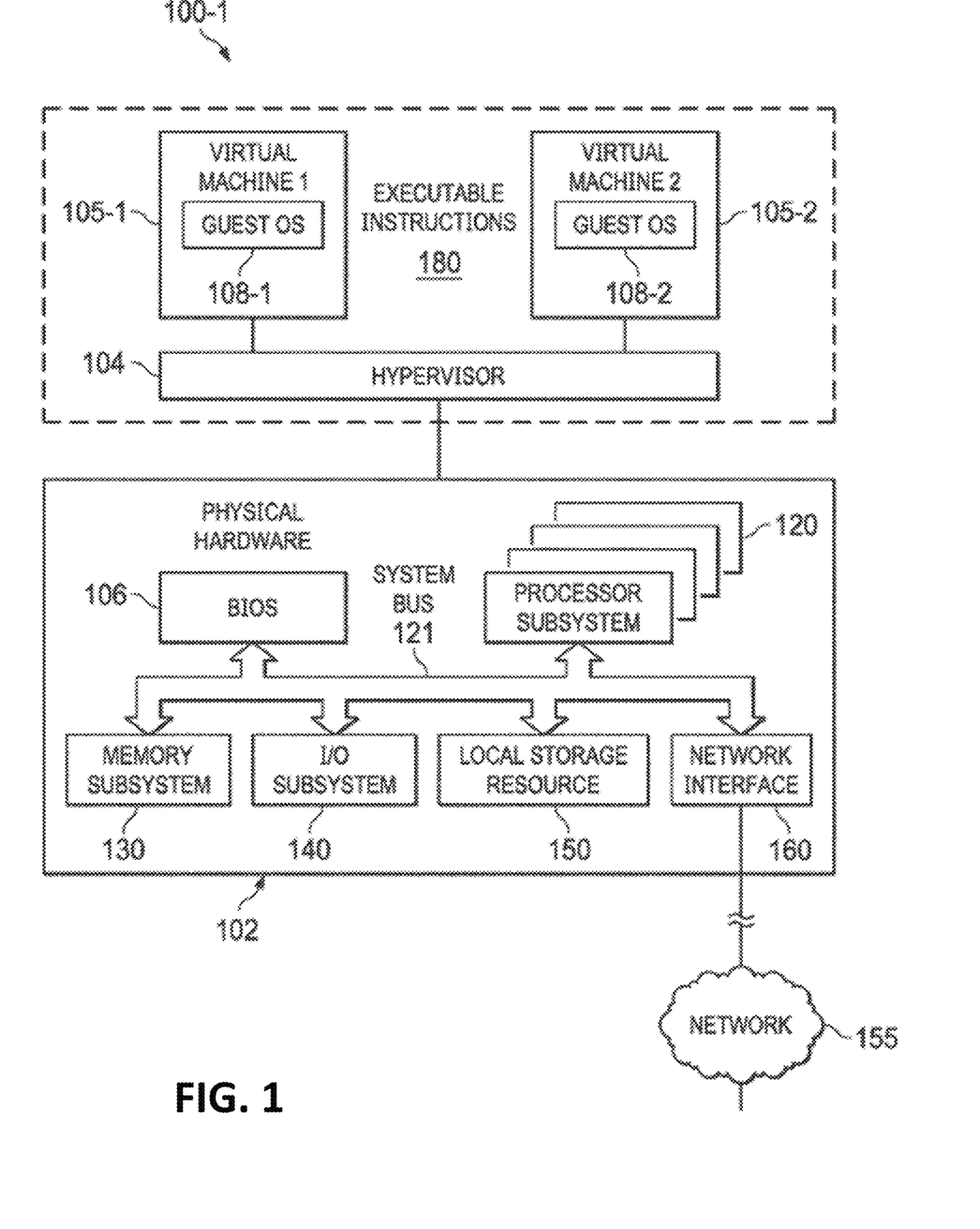
FIG. 1 illustrates a virtualized information handling system including a baseboard management controller having a network adapter coupled to a bandwidth manager.

Referring now to the drawings, FIG. 1 illustrates a block diagram of selected elements of an information handling system 100-1, in accordance with embodiments of the present disclosure. As depicted in FIG. 1, information handling system 100-1 may represent an information handling system comprising physical hardware 102 and executable instructions 180 (including hypervisor 104 and one or more virtual machines 105). System 100-1 may also include external or remote elements, for example, network 155.

As shown in FIG. 1, components of physical hardware 102 may include, but are not limited to, processor subsystem 120, which may comprise one or more processors (not explicitly depicted in FIG. 1), and system bus 121 that may communicatively couple various system components to processor subsystem 120 including, for example, a BIOS 106, a memory subsystem 130, an I/O subsystem 140, local storage resource 150, and a network interface card (NIC) 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCIe bus, HyperTransport (HT) bus, and Video Electronics Standards Association (VESA) local bus.

The NIC 160 illustrated in FIG. 1 may comprise any suitable system, apparatus, or device operable to serve as an interface between information handling system 100-1 and network 155. NIC 160 may enable information handling system 100-1 to communicate over network 155 using a suitable transmission protocol or standard, including, but not limited to, transmission protocols or standards enumerated below with respect to the discussion of network 155. Network 155 may be implemented as, or may be a part of, a personal area network (PAN), local area network (LAN), a metropolitan area network (MAN), a wide area network (WAN), a wireless local area network (WLAN), a virtual private network (VNP), an intranet, the Internet or another appropriate architecture or system that facilitates the communication of signals, data or messages (generally referred to as data). Network 155 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, firmware, or any combination thereof.

As depicted in FIG. 1, processor subsystem 120 may comprise any suitable system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and execute program instructions or process data stored locally (e.g., in BIOS 106, memory subsystem 130, or another component of physical hardware 102). In the same or alternative embodiments, processor subsystem 120 may interpret and execute program instructions or process data stored remotely. In particular, processor subsystem 120 may represent a multi-processor configuration that includes at least a first processor and a second processor (see also FIG. 2).

BIOS 106 may include any system, device, or apparatus configured to identify, test, and/or initialize information handling resources of information handling system 100-1, and/or initialize interoperation of information handling system 100 with other information handling systems. "BIOS" may broadly refer to any system, device, or apparatus configured to perform such functionality, including without limitation, a Unified Extensible Firmware Interface (UEFI). In some embodiments, BIOS 106 may be implemented as a program of instructions that may be read by and executed on processor subsystem 120 to carry out the functionality of BIOS 106. In these and other embodiments, BIOS 106 may comprise boot firmware configured to be the first code executed by processor subsystem 120 when information handling system 100-1 is booted and/or powered on. As part of its initialization functionality, code for BIOS 106 may be configured to set components of information handling system 100-1 into a known state, so that one or more applications (e.g., an operating system or other application programs) stored on compatible media (e.g., disk drives) may be executed by processor subsystem 120 and given control of information handling system 100-1.

Memory subsystem 130 may comprise any suitable system, device, or apparatus operable to retain and retrieve program instructions and data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, or a suitable selection or array of volatile or non-volatile memory that retains data after power to an associated information handling system, such as information handling system 100-1, is powered down. In some embodiments, some or all of memory subsystem 130 may comprise persistent memory, such as one or more Non-Volatile Dual-Inline Memory Modules (NV-DIMMs) configured to maintain persistence of data written to the persistent memory in the event of a power event in which electrical energy to the persistent memory is withdrawn.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and data. In information handling system 100-1, I/O subsystem 140 may comprise any suitable system, device, or apparatus generally operable to receive and transmit data to or from or within information handling system 100-1. I/O subsystem 140 may represent, for example, any one or more of a variety of communication interfaces, graphics interfaces, video interfaces, user input interfaces, and peripheral interfaces.

Hypervisor 104 may comprise software (i.e., executable code or instructions) and/or firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary and/or commercially available virtualization platforms, including, but not limited to, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP. In one embodiment, hypervisor 104 may comprise a specially designed operating system (OS) with native virtualization capabilities. In another embodiment, hypervisor 104 may comprise a standard OS with an incorporated virtualization component for performing virtualization. In another embodiment, hypervisor 104 may comprise a standard OS running alongside a separate virtualization application. In embodiments represented by FIG. 1, the virtualization application of hypervisor 104 may be an application running above the OS and interacting with physical hardware 102 only through the OS. Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, and as firmware running on physical hardware 102), also referred to as device pass-through. By using device pass-through, the virtual machine may utilize a physical device directly without the intermediate use of operating system drivers. As a further alternative, the virtualization application of hypervisor 104 may, on various levels, interact directly with physical hardware 102 (e.g., similar to the way the OS interacts directly with physical hardware 102, and as firmware running on physical hardware 102) without utilizing the OS, although still interacting with the OS to coordinate use of physical hardware 102.

As shown in FIG. 1, virtual machine 1 105-1 may represent a host for guest OS 108-1, while virtual machine 2 105-2 may represent a host for guest OS 108-2. To allow multiple operating systems to be executed on information handling system 100-1 at the same time, hypervisor 104 may virtualize certain hardware resources of physical hardware 102 and present virtualized computer hardware representations to each of virtual machines 105. In other words, hypervisor 104 may assign to each of virtual machines 105, for example, one or more processors from processor subsystem 120, one or more regions of memory in memory subsystem 130, one or more components of I/O subsystem 140, etc. In some embodiments, the virtualized hardware representation presented to each of virtual machines 105 may comprise a mutually exclusive (i.e., disjointed or non-overlapping) set of hardware resources per virtual machine 105 (e.g., no hardware resources are shared between virtual machines 105). In other embodiments, the virtualized hardware representation may comprise an overlapping set of hardware resources per virtual machine 105 (e.g., one or more hardware resources are shared by two or more virtual machines 105).

In some embodiments, hypervisor 104 may assign hardware resources of physical hardware 102 statically, such that certain hardware resources are assigned to certain virtual machines, and this assignment does not vary over time. Additionally or alternatively, hypervisor 104 may assign hardware resources of physical hardware 102 dynamically, such that the assignment of hardware resources to virtual machines varies over time, for example, in accordance with the specific needs of the applications running on the individual virtual machines. Additionally or alternatively, hypervisor 104 may keep track of the hardware-resource-to-virtual-machine mapping, such that hypervisor 104 is able to determine the virtual machines to which a given hardware resource of physical hardware 102 has been assigned.

In FIG. 1, each of virtual machines 105 may respectively include an instance of a guest operating system (guest OS) 108, along with any applications or other software running on guest OS 108. Each guest OS 108 may represent an OS compatible with and supported by hypervisor 104, even when guest OS 108 is incompatible to a certain extent with physical hardware 102, which is virtualized by hypervisor 104. In addition, each guest OS 108 may be a separate instance of the same operating system or an instance of a different operating system. For example, in one embodiment, each guest OS 108 may comprise a LINUX OS. As another example, guest OS 108-1 may comprise a LINUX OS, guest OS 108-2 may comprise a MICROSOFT WINDOWS OS, and another guest OS on another virtual machine (not shown) may comprise a VXWORKS OS. Although information handling system 100-1 is depicted as having two virtual machines 105-1 and 105-2, it will be understood that, in particular embodiments, different numbers of virtual machines 105 may be executing on information handling system 100-1 at any given time.

In operation of information handling system 100-1 shown in FIG. 1, hypervisor 104 of information handling system 100-1 may virtualize the hardware resources of physical hardware 102 and present virtualized computer hardware representations to each of virtual machines 105. Each guest OS 108 of virtual machines 105 may then begin to operate and run applications and/or other software. While operating, each guest OS 108 may utilize one or more hardware resources of physical hardware 102 assigned to the respective virtual machine by hypervisor 104.

In at least one embodiment, information handling system 100 is provisioned and enabled to support virtualization of NIC 160. In such an embodiment, NIC 160 may be configured to function as two or more virtual network ports where each virtual network port is associated with a virtual machine. In at least some embodiments, this virtualization may include components and/or features analogous to components and features exemplified by a network partitioning (NPAR) feature available in PowerEdge Servers from Dell, Inc. NPAR enables an information handling system to divide a NIC with two physical ports into as many as eight PCIe functions with flexible bandwidth allocation, where each PCIe function represents a partition and corresponds to a virtual network port that is enumerated by the hypervisor.

Figure 2:
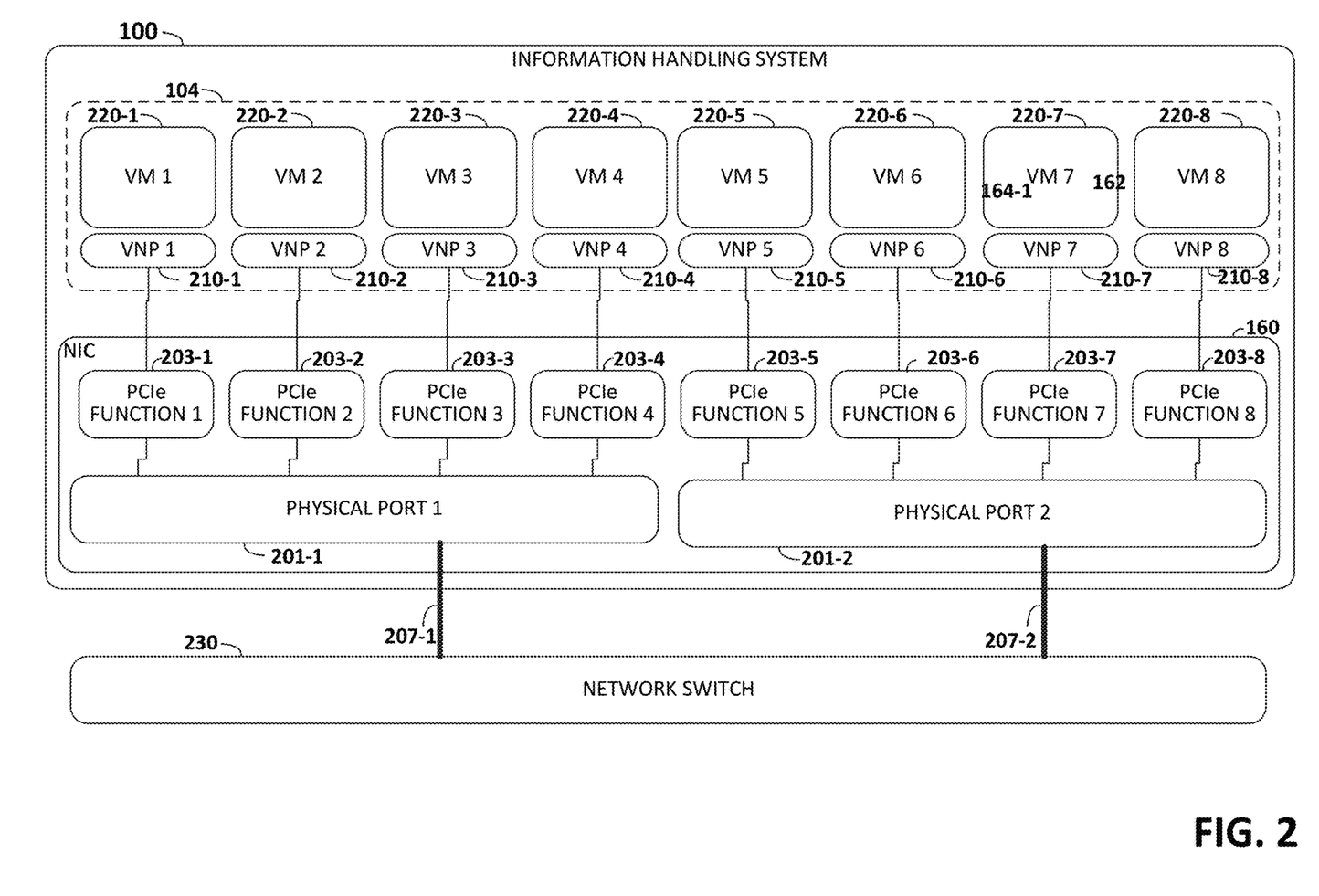
FIG. 2 illustrates an exemplary virtualized network adapter including a virtual network port associated with a corresponding VM.

FIG. 2 illustrates information handling system 100 with an exemplary virtualized network interface configuration in which a NIC 160 with two physical ports 201-1 and 201-2 is configured to expose as many as eight PCIe functions 203-1 to 203-8 to a hypervisor 104. The hypervisor 104 illustrated in FIG. 2 has instantiated eight virtual machines (VMs) 220 and enumerated the eight PCIe functions 203-1 through 203-8 as eight virtual network ports (VNP) 210-1 through 210-8 and each VNP 210 has been assigned to a corresponding VM 220.

In the illustrated embodiment, first physical port 201 is connected to network switch 230 via physical interconnect 207-1 and second physical port 201-2 is connected to network switch 230 via physical interconnect 207-2. In Ethernet embodiments, each physical interconnect 207 may be implemented as a 10, 40, or 100 Gbe interconnect.

It will be readily appreciated by those of ordinary skill in the field of network interfaces that the bandwidth of each physical interconnect 207 is shared among the PCIe functions 203 associated with the applicable physical port 201. It will be further appreciated that, with rare and specific exceptions, the bandwidth demand associated with VM1 220-1 through VM4 220-4 is unlikely to be either static or predictable. Accordingly, it is desirable to implement VNPs 210 with flexible bandwidth configurations. Conventionally, bandwidth configuration has been an essentially manual task performed by a network administrator at the host level. Information handling systems described in more detail below with respect to FIG. 3 through FIG. 8 address at least some of the most readily apparent limitations of the conventional approach to managing bandwidth allocation on a virtualized and shared network interface.

In at least one embodiment, information handling system 100 is configured with a network bandwidth manager (NBM), discussed in detail below, configured to manage allocation of network bandwidth among a group of two or more VNPs. The NBM may be implemented as a component, feature, or capability of a management resource such as a baseboard management controller (BMC) of information handling system 100. The NBM may be configured to dynamically manage bandwidth allocation for each VNP by adjusting minimum and maximum bandwidth allocation parameters for each VNP.

In at least one embodiment disclosed herein, the NBM monitors and analyzes (1) network usage of all VNPs and (2) dynamically determined virtual machine priority levels. In embodiments that implement the NBM within the BMC, the NBM may beneficially leverage an existing out-of-band channel, referred to as the OS-passthrough channel, to discover associations between virtual machines and VNPs.

In at least some embodiment, analytics intelligence is employed to assess various parameters of each VM and to determine a priority level for each VM. In some embodiments, these derived priority levels are quantized into a relatively small number of permissible values, e.g., Low, Medium, and High). The intelligent determination of VM priority may be based, at least in part, on factors including, without limitation, resource utilization data, installed application details, the VM's health state and telemetry information. Data indicative of these parameters are collected and provided to an Analytics Component, which generates a list of priority level recommendations for each VM. In at least some embodiments, an administrator of the applicable system or facility may have authority to modify the recommendation(s). One disclosed embodiment of the DVP engine employs one or more Autoregressive Integrated Moving Average (ARIMA) modules to aid in the VM priority level determination.

In some embodiment, the NBM employs an algorithm to analyze VNP bandwidth and recommend the Minimum and Maximum bandwidth percentage for each logical ports. The bandwidth percentage values recommended by the NBM may be configured by all the VNPs using the Out-of-Band channel. To communicate and modify the bandwidth assignment for a VNP, an out-of-band channel like BMC Idrac may be utilized. In the context of certain servers from applicant Dell, OS Passthrough and OMIVV (OpenManage Integration for VMware vCenter) may be used to for communicating VM priority and VM usage from the hypervisor.

Figure 3:
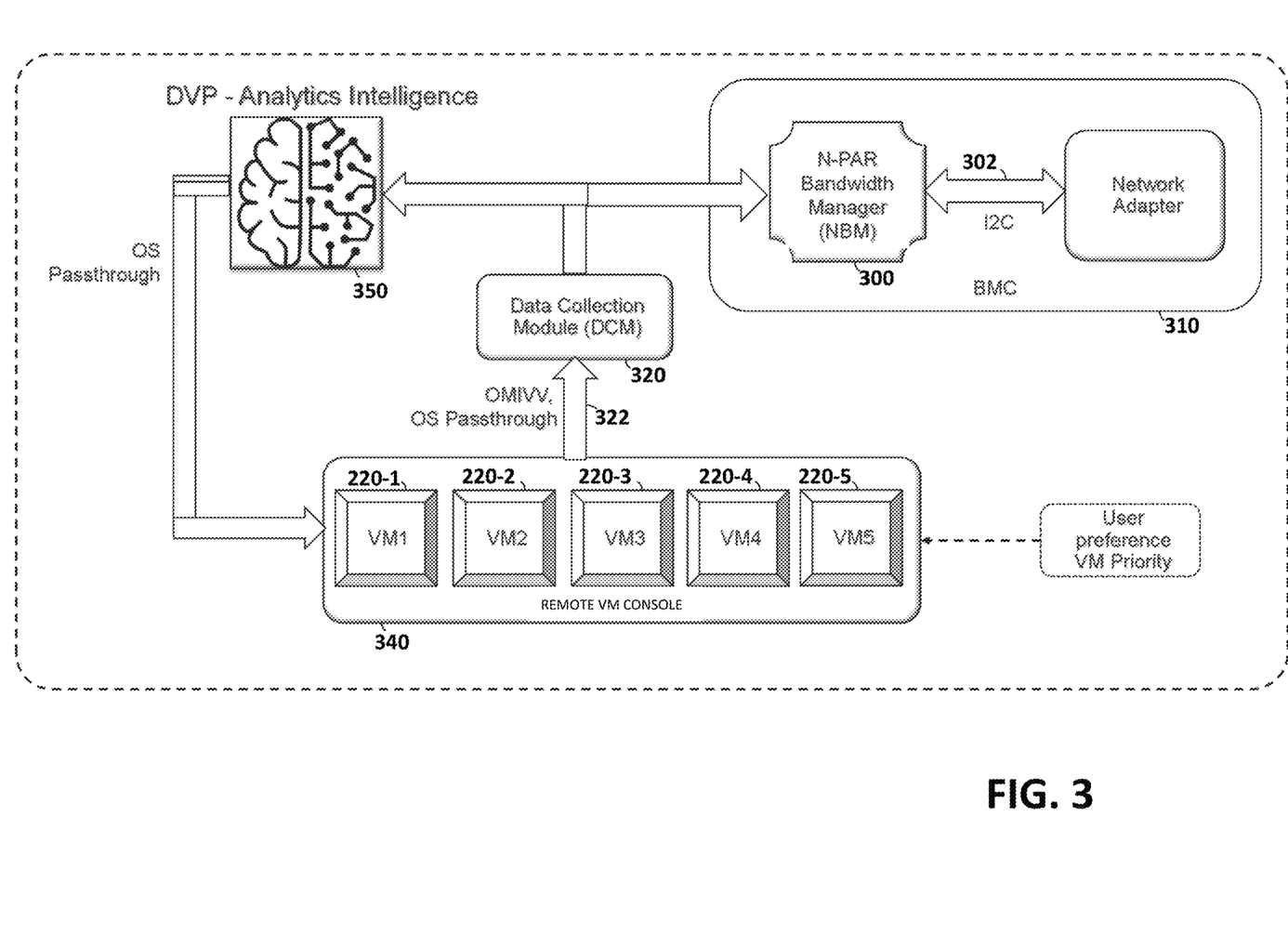
FIG. 3 illustrates information handling resources for dynamically determining a priority category for one or more virtual machines.

Referring now to FIG. 3, a block diagram of information handling system 100 illustrates an exemplary implementation of an NBM 300 in accordance with the present invention. The NBM 300 illustrated in FIG. 3 is implemented within a BMC 310 of information handling system 100. In the illustrated embodiment, a standards-based out of band interconnect, represented by the inter-integrated circuit (I2C) bus 302 in FIG. 3 may be employed to communicate network utilization data to NBM 300. FIG. 3 further illustrates a data collection module (DCM) 320 monitoring five instantiated virtual machines, VM1 220-1 through VM5 220-5, via an out of band channel 322 coupled between DCM 320 and a remote VM console 340, which may represent a resource for providing console access and client device connection to VMs executing on the applicable system. In some embodiment, remote VM console 340 may include features analogous to features found in the VMware Remote Console resource, provides console access and client device connection to VMs on a remote host by way of an OMIVV channel, an OS passthrough channel or the like. The DCM 320 illustrated in FIG. 3 communicates monitored data to NBM 300 and to the dynamic VM priority (DVP) module 350. The DVP module 350 incorporates analytics intelligence to assess resource utilization data and other data to determine a priority level or a priority level recommendation. In at least some embodiments, the analytics intelligence within DVP module 350 may include machine learning resources and algorithms, such as supervised, unsupervised, or reinforcement training algorithms, to analyze VM resource utilization data and other data such as installed application data, and health data as conveyed by various logs and alerts, to determine VM priority recommendations. A machine learning engine may use algorithms to identify relationships between parameters for which data is acquired and monitored and one or more other parameters, conditions, or states relevant to VM priority levels. In some embodiments, a rule-based engine may be used alone or in combination with other algorithms for determining priority levels. For purposes of this disclosure, a machine learning engine may use algorithms to identify relationships between PC user activity and one or more other parameters, conditions, or states relevant to the collaboration session.

Figure 4:
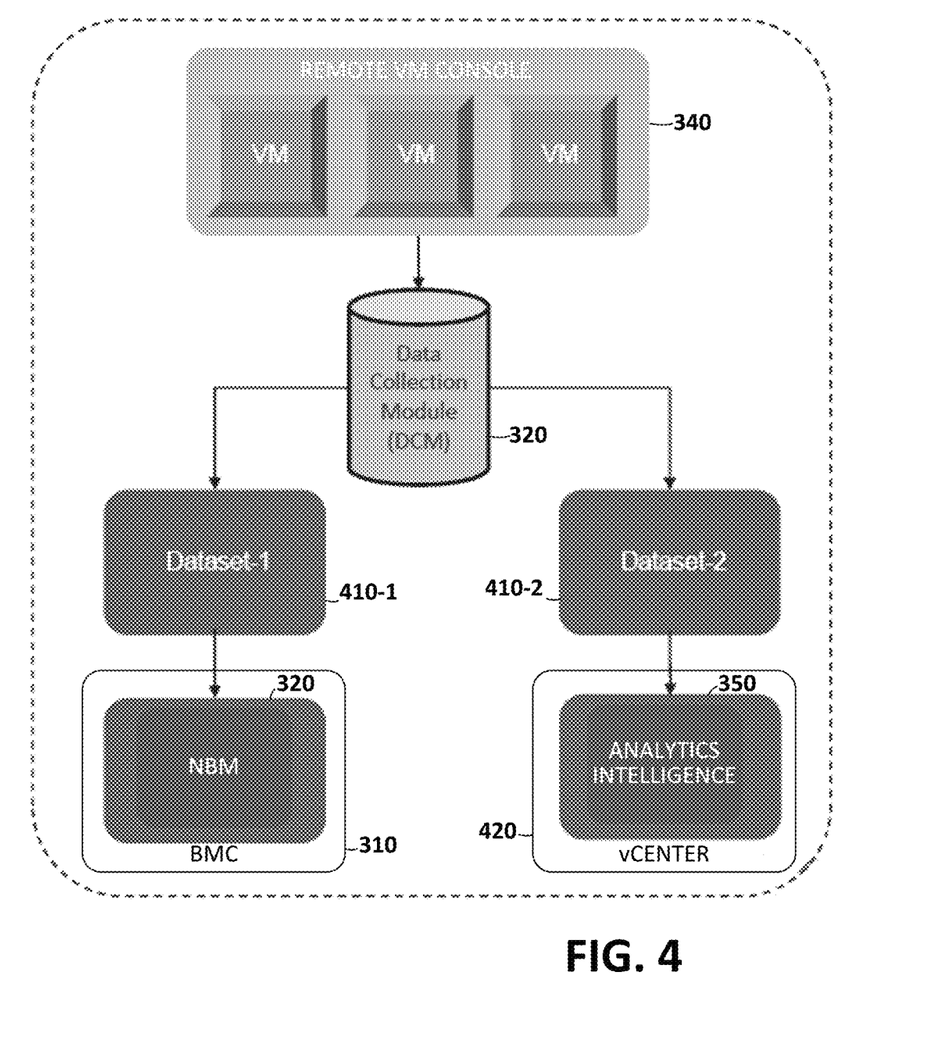
FIG. 4 illustrates a data collection model suitable for use in the present disclosure.

Referring now to FIG. 4, an illustrated embodiment of DCM 320 filters collected data into a first data set, identified in FIG. 4 as Dataset-1 410-1, and a second data set, identified in FIG. 4 as Dataset-2 410-2. In the illustrated embodiment, Dataset-1 410-1 is provided to BMC 310 while Dataset-2 410-2 is provided to vCenter 420. In at least one embodiment, Dataset-1 410-1 may include the name and other biographical details of the VNP and the current priority level of the corresponding VM. Dataset-1 410-1 is illustrated being provided to NBM 300 of BMC 310. In at least some embodiments, Dataset-2 410-2 may include data indicative of the application(s) installed on the applicable VM, the resource utilization of the applicable VM, and log and alert information, which is sent to the analytics engine of DVP module 350 in vCenter 420 or another suitable systems management server suitable for use in a virtualized environment.

Figure 5:
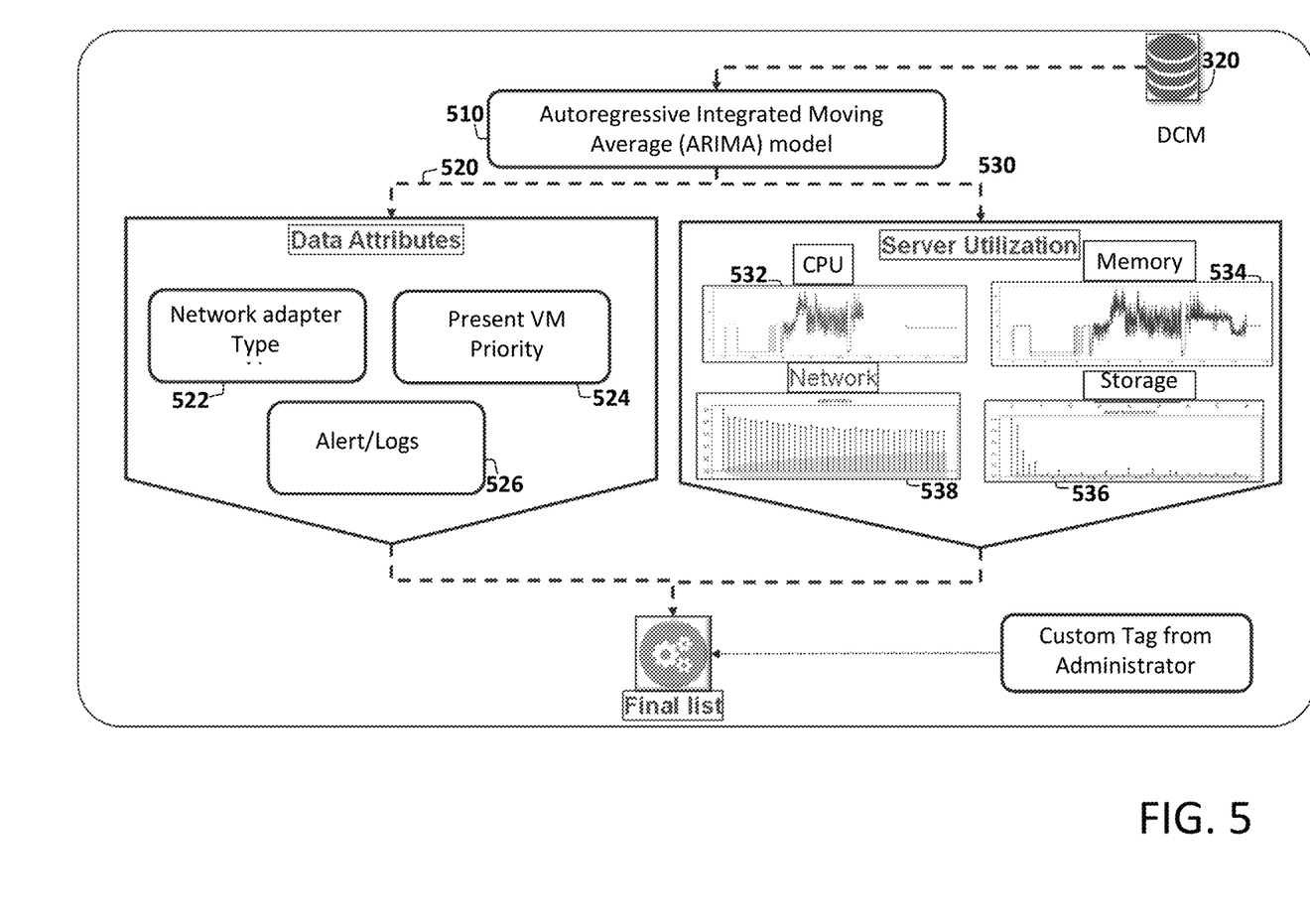
FIG. 5 illustrates detail of dynamic VP priority module.

Referring now to FIG. 5, a block diagram of DVP module 350 is illustrated. For the DVP module 350 illustrated in FIG. 5, data from DCM 320 is provided to an ARIMA engine 510, which filters the collected data into two categories. Attribute data 520, including network adapter identification information 522, present VM priority information 524, and log and alert information 526

The data collected by DCM 320 may be classified and fed to the ARIMA model 510, which may derive priority levels for one or more of the VMs. A VM's derived priority level can change over time based on the changes in the various parameters, including application data, resource utilization, business criticality, and so forth.

In at least one embodiment, the DVP analytics module may classify the VM's priority into one of a limited set of possible priority level values. As an example, one embodiment may define three priority levels, High, Medium, and Low, the analytics module may, periodically or otherwise, determine a derived priority level recommendation for each VM. The derived priority levels may be the list of priority levels may be stored for future analytical purposes. An analytics engine within DVP module 350 learns each VM's priority over time and uses this information to predict which VMs can be critical on a timely basis. It also helps in keeping the criticality list up to date using this mechanism. Whenever new VMs are added the DVP Analytics will handle and adapt to derive the solution at that specific time.

Figure 6:
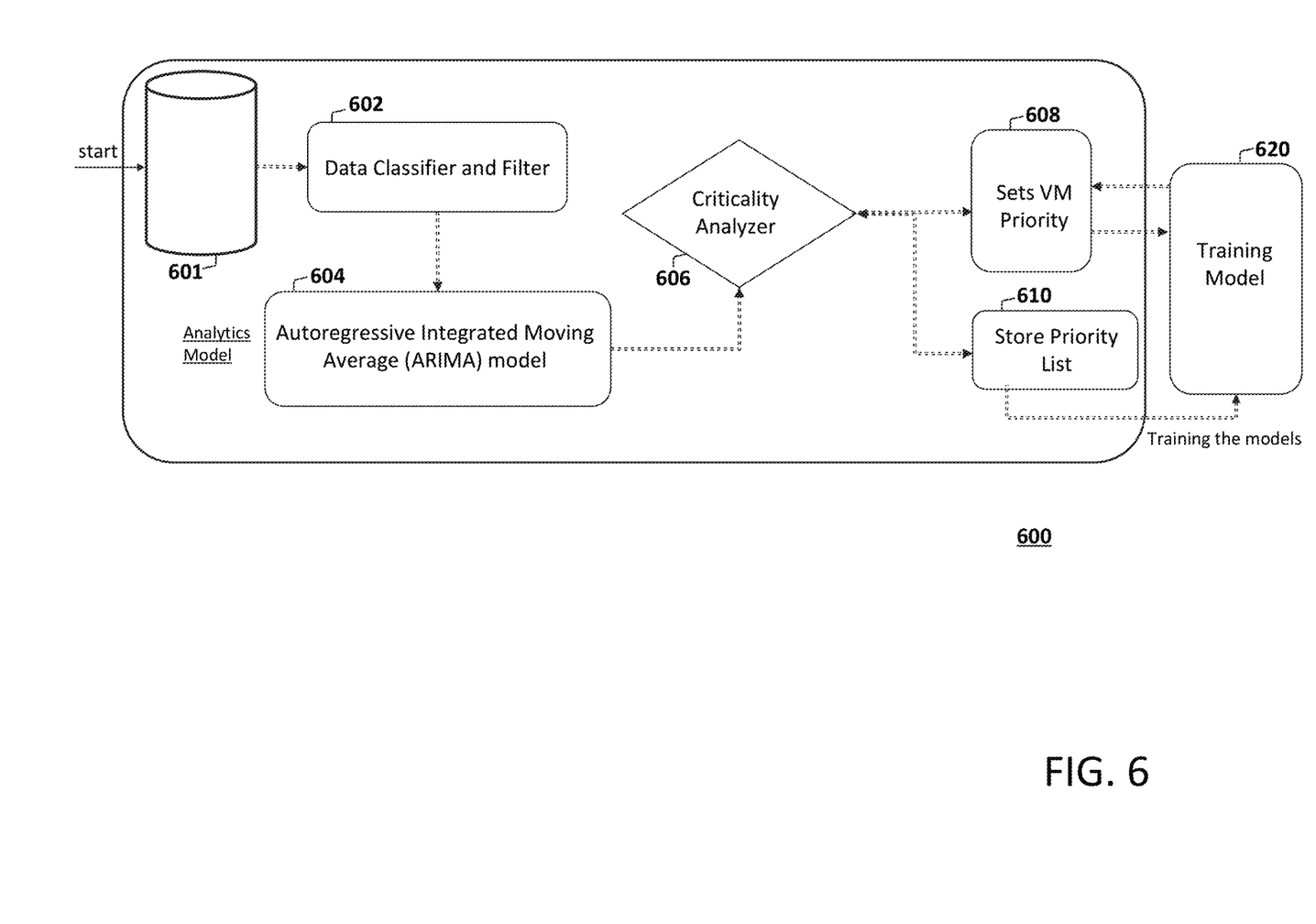
FIG. 6 illustrates a flow diagram of a dynamic priority determination module.

FIG. 6 illustrates a flow diagram of a method 600 for determining priority levels for two or more virtual machines based on a combination of parameters including priority level parameters such as resource utilization and applications executing as well as the network utilization of a VNP assigned to the VM. As illustrated in FIG. 6, a database 601 includes data collected by DCM 320 (FIG. 3), which is provided to data classifier and filter 602. Data classifier and filter 602 may filter and classify data as described with respect to FIG. 4. The filtered and classified information is provided to ARIMA model 604 which analyzes the applicable data and provides forecast information indicative of the model's estimate of some future value of various parameters. In such embodiments, forecasted information is forwarded to a criticality analyzer 606, which evaluates the forecasted information and additional information including the current priority level for any one or more of the applicable VMs as well as business criticality information. The illustrated embodiment of criticality analyzer 606 further stores (block 610) a list of the VM priorities to a training model 620. Information stored in training model information 620 may be accessed by priority setting operations in block 608 such that past and forecasted values of VM priorities can influence present and future priority level determinations. In this manner, the accuracy and stability of DVP module 350 may improve with age as more data is incorporated. This improvement in accuracy and stability may include calculating or otherwise determining error margins, representing difference in the projected value of a utilization module, and revising one or more predictive coefficients or other parameters in a way that would reduce the amount of the error.

Figure 7:
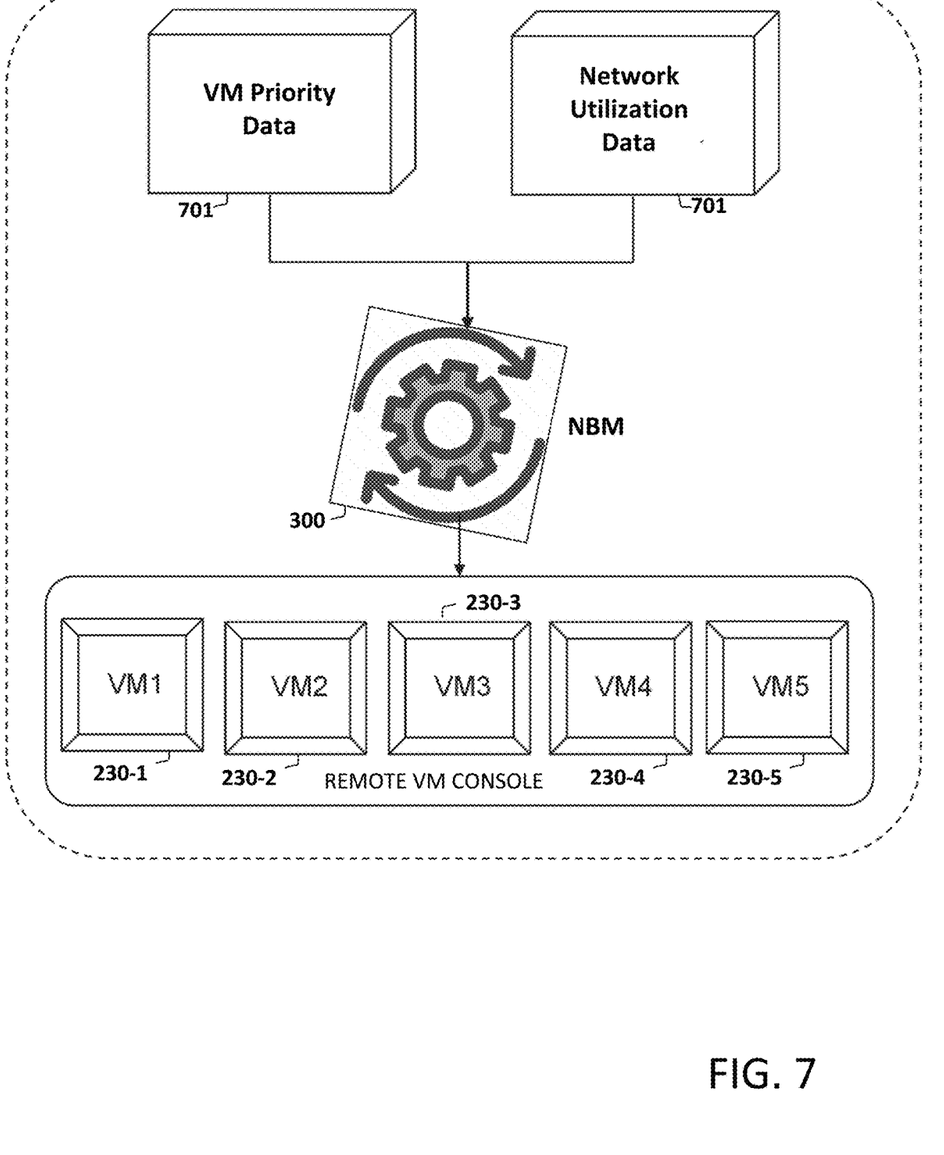
FIG. 7 illustrates a network bandwidth manager coupled to receive VM priority information and network/hardware utilization data.
Figure 8:
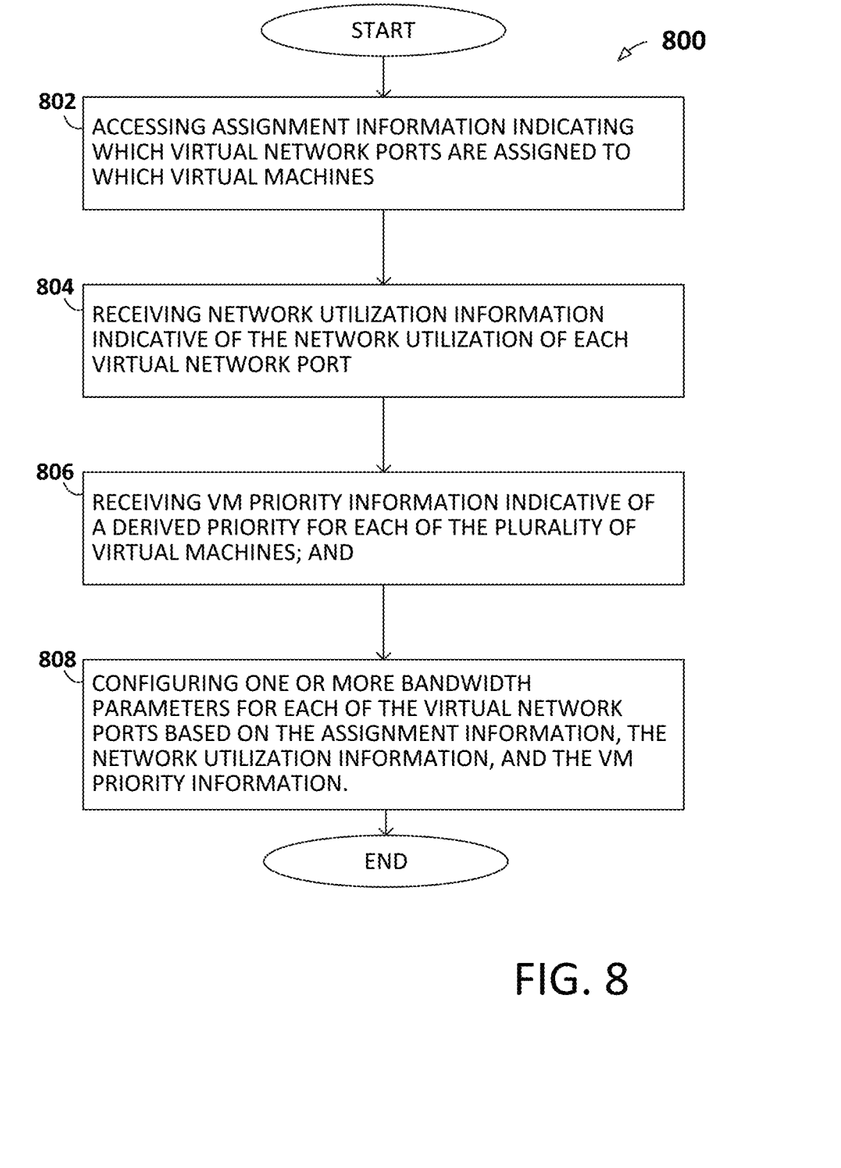
FIG. 8 is a flow diagram of a method for managing bandwidth allocation for a plurality of virtual network ports.

Referring now to FIG. 7, the NBM 300 is illustrated configured to receive VM priority level information 701 and network utilization information 702 corresponding to one or more VNPs. The NBM 300 is configured to assess the priority information 701 as well as the network utilization information 702 to configure the VNPs, including, as an example, configuring bandwidth threshold and/or limit settings such as a maximum and/or minimum bandwidth setting for each VNP communicatively coupled to VM priority level information Turning now to FIG. 8, a flow diagram illustrates a method 800 for managing bandwidth allocation for a plurality of VNPs assigned to a corresponding plurality of VMs created and managed by a hypervisor executing on an information handling system. The method 800 illustrated in FIG. 8 begins with a resource, such as a network bandwidth manager implemented in a baseboard management controller of the information handling system, accesses (block 802) assignment information indicating which virtual network ports are assigned to which virtual machines. Network utilization information, indicative of the network utilization of each virtual network port, is received (block 804). Additionally, VM priority information is received (block 806) by the NBM. The NBM may then configure one or more bandwidth parameters including, as non-limiting examples, a maximum bandwidth and/or a minimum bandwidth, for each of the virtual network ports based on the assignment information, the network utilization information, and the VM priority information.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for allocating bandwidth among a plurality of virtual network ports assigned to a plurality of virtual machines associated with a hypervisor, wherein the method comprises:
    accessing assignment information indicating which virtual network ports are assigned to which virtual machines;
    receiving, by a network bandwidth manager, network utilization information indicative of a network utilization of each virtual network port;
    receiving, by the network bandwidth manager, virtual machine priority information indicative of a derived priority for each of the plurality of virtual machines; and
    configuring one or more network port bandwidth parameters individually for each of the plurality of network ports based on the assignment information, the network utilization information, and the virtual machine priority information;
    wherein receiving the virtual machine priority information includes receiving the virtual machine priority information from a dynamic virtual machine priority (DVP) module, wherein the DVP module comprises a machine learning engine configured to automatically determine a derived priority for each virtual machine; and
    wherein the DVP module determines the derived priority for each individual virtual machine based on collected data including:
        resource utilizations of the individual virtual machines;
        application information indicative of installed applications; and
        virtual machine log/alert information indicative of a health of a corresponding virtual machine.

2. The method of claim 1, wherein the network bandwidth manager comprises a baseboard management controller resource.

3. The method of claim 2, wherein accessing the assignment information comprises accessing the assignment information via an OS-passthrough channel communicatively coupling the baseboard management controller resource and the hypervisor.

4. The method of claim 1, wherein configuring one or more network port bandwidth parameters for each of the plurality of network ports includes configuring, for each virtual network port, at least one of:
    a minimum bandwidth; and
    a maximum bandwidth.

5. The method of claim 1, wherein the DVP module classifies the derived priority for each virtual machine into a priority selected from: high priority, medium priority, and low priority.

6. The method of claim 1, wherein the virtual machine resource utilization parameters include:
    one or more CPU utilization parameters;
    one or more memory utilization parameters;
    one or more storage utilization parameters;
    one or more network utilization parameters;
    one or more business criticality parameters.

7. The method of claim 6, wherein the collected data further includes attribute parameters including:
    present priority parameters indicative of a present priority; and
    adapter identification information.

8. An information handling system, comprising:
   a processing subsystem including one or more central processing units (CPUs);
   a memory subsystem including memory resources communicatively coupled to the processing resources;
   a storage subsystem;
   one or more network adapters;
   a baseboard management controller including a network bandwidth manager configured to perform bandwidth management operations comprising:
   accessing assignment information indicating which of a plurality of virtual network ports are assigned to which of a plurality virtual machines associated with a hypervisor;
   receiving, by a network bandwidth manager, network utilization information indicative of the network utilization of each virtual network port;
   receiving, by the network bandwidth manager, virtual machine priority information indicative of a derived priority for each of the plurality of virtual machines; and
   configuring one or more network port bandwidth parameters individually for each of the plurality of network ports based on the assignment information, the network utilization information, and the virtual machine priority information;
   wherein receiving the virtual machine priority information includes receiving the virtual machine priority information from a dynamic virtual machine priority (DVP) module, wherein the DVP module comprises a machine learning engine configured to automatically determine a derived priority for each virtual machine; and
   wherein the DVP module determines the derived priority for each individual virtual machine based on collected data including:
   resource utilizations of the individual virtual machines;
   application information indicative of installed applications; and
   virtual machine log/alert information indicative of a health of a corresponding virtual machine.

9. The information handling system of claim 8, wherein the network bandwidth manager comprises a baseboard management controller resource.

10. The information handling system of claim 9, wherein accessing the assignment information comprises accessing the assignment information via an OS-passthrough channel communicatively coupling the baseboard management controller resource and the hypervisor.

11. The information handling system of claim 8, wherein configuring one or more network port bandwidth parameters for each of the plurality of network ports includes configuring, for each virtual network port, at least one of:
   a minimum bandwidth; and
   a maximum bandwidth.

12. The information handling system of claim 8, wherein the DVP module classifies the derived priority for each virtual machine into a priority selected from: high priority, medium priority, and low priority.

13. The information handling system of claim 8, wherein the virtual machine resource utilization parameters including:
   one or more CPU utilization parameters;
   one or more memory utilization parameters;
   one or more storage utilization parameters;
   one or more network utilization parameters;
   one or more business criticality parameters.

14. The information handling system of claim 13, wherein the collected data further includes attribute parameters including:
   present priority parameters indicative of a present priority; and
   adapter identification information.

* * * * *